Dec. 16, 1952
M. SAVIO
2,621,587
ADJUSTABLE HOLDER FOR COOKING WIENERS
BY CONDUCTION OF ELECTRICITY
Filed Nov. 24, 1950
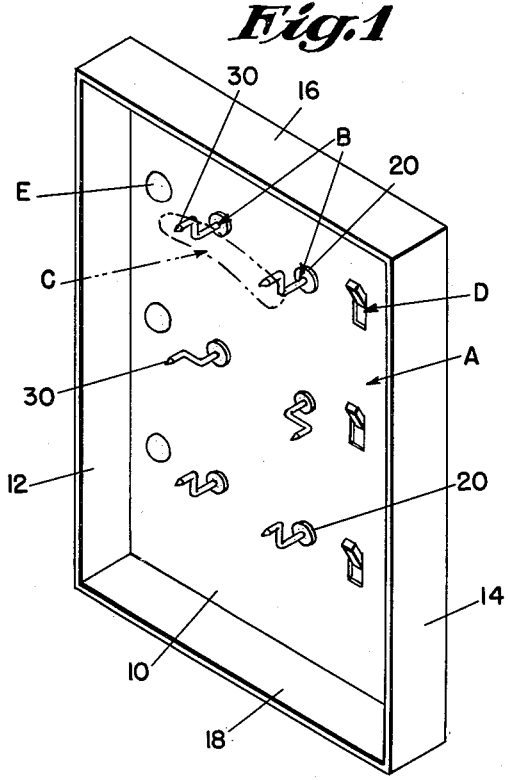
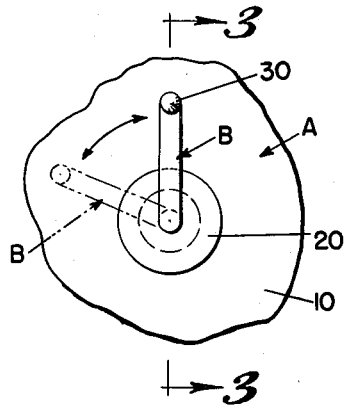
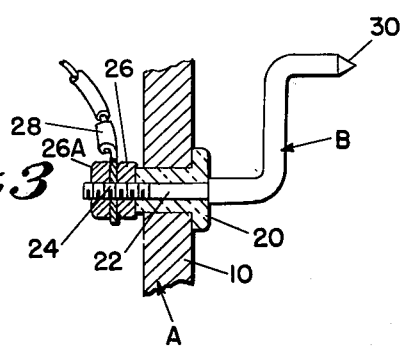
INVENTOR.
Michael Savio
BY
Harry Langsam
Attorney

UNITED STATES PATENT OFFICE 2,621,587

ADJUSTABLE HOLDER FOR COOKING WIENERS BY CONDUCTION OF ELECTRICITY

Michael Savio, Philadelphia, Pa.

Application November 24, 1950, Serial No. 197,211

1 Claim. (Cl. 99—358)

My invention relates to a device for conduction cooking of wieners, or other meats such as sausages and frankfurters, and relates particularly to a holder which is adjustable so that wieners of various length may be easily and readily placed thereon.

Heretofore, devices for conduction cooking of wieners have been made and used, but these devices had fixed electrodes in the shape of a pin or hook for impaling the wieners whose position could not be altered, and as a result, very short wieners had to be impaled a distance from the ends leaving the ends uncooked, or if the wiener was bent so that it could be impaled near the ends it often resulted in the wiener being broken whereafter it had to be discarded and a new one placed on the conduction cooking device. These devices were wasteful of wieners.

It, therefore, is an object of my invention to provide a device for conduction cooking of wieners which has an adjustable holder for the wiener so that very short or very long wieners may be impaled near the ends of the wiener so that short or long wieners may be completely cooked and utilized without waste.

Another object of my invention is to provide a device for conduction cooking of wieners which has a holder for the wiener which is easily and readily adjusted to accommodate wieners of different lengths.

Other objects of my invention are to provide a device for conduction cooking of wieners which is simply and economically produced, which is sturdy in construction, and which is highly effective in use.

With the above and related objects in view my invention consists in the details of construction and relationship of parts, as will be more fully understood when the following description is read in conjunction with the accompanying drawing, in which:

Fig. 1 is a perspective view of a device for electrocuting wieners embodying my invention.

Fig. 2 is a detailed front view of an electrode of the device of Fig. 1.

Fig. 3 is a cross-sectional view taken along the line 3—3 of Fig. 2.

Referring now in greater detail to the drawing wherein similar parts are designated by similar reference characters, I show a device for conduction cooking of wieners, generally designated as A, which is provided with a plurality of pairs of electrodes, generally designated as B, through which a current is enabled to pass when a wiener, generally designated as C, is placed, by impaling, thereon. A switch, generally designated as D, is provided with each pair of electrodes B to cut off the flow of current between conduction cooking of wieners or when the device is not in use, as well as when removing a wiener C from a pair of electrodes B.

I also provide an indicating light, generally designated as E, with each pair of electrodes B which shows when current is passing through the pair of electrodes B.

The device A may be made of wood, metal, or other suitable material. The wiener conduction cooking device A comprises a support 10 for the electrodes B, switches D, and lights E, and may take the form of a box as illustrated in Fig. 1 having a supporting bottom 10 for the components hereinbefore mentioned, a pair of parallel sides 12 and 14, and a pair of parallel ends 16 and 18 which are attached to, or formed integral with, the supporting bottom 10, the sides 12 and 14 as well as the ends 16 and 18 extending outwardly from the supporting bottom to enclose and recess the electrodes B, switches D, and lights E. The configuration shown, it should be kept in mind, is only by way of illustration, as the conduction cooking device A may be made in any shape suitable for the place it is desired to stand or mount it. Bores (not shown) are provided through the support 10 to accommodate hollow insulating bushings 20, switches D, and lights E. The bores for the hollow bushings 20 are of a size such that the hollow insulating bushings 20 may easily turn or rotate in the support 10.

The electrodes B are made of any suitable electrically conductive material and are substantially Z-shaped. As all the electrodes are of like construction only one will be described. One free end of the Z-shaped electrode B is extended to form an annular shaft 22, slightly smaller in size than the circumference of the electrode B, which is passed through the hollow insulating bushing 20. Threads 24 are provided on the shaft 22 upon which a suitable nut 26 is threaded to secure the electrode B in the bushing 20, as well as to prevent the bushing 20 from pulling out of the support 10. A conductive wire 28 carrying current from a suitable electrical source (not shown) has a portion of its end bared. The bared portion of the conductive wire 28 is wrapped around the shaft 22 back of the nut 26 and another nut 26A is threaded upon the shaft 22 to secure the wire 28 to the shaft and against the nut 26. The other end 30 of the Z-shaped electrode B is pointed so that it may readily impale a wiener C. From the foregoing, it can readily be seen that the electrodes B can be rotated about the bushing 20 so that the pointed ends 30 may be brought toward or away from each other as seen in Fig. 1 to vary the distance between pointed ends 30 of a pair of electrodes to accommodate wieners C of different lengths (short or long) at or near their ends so that they may be completely cooked.

The wieners C may be of any commercially available type and as is well known, different brands, or types, vary in size which is the reason why the electrodes B are of the construction described hereinbefore.

The switches D may be of any commercially available on-off type. An individual switch D is connected in series with each separate conductive wire 28 serving a different pair of electrodes B.

The indicating lights E are also each connected in series with a different conductive wire 28 so that when a wiener C is placed upon a pair of electrodes B and the switch D for that particular pair of electrodes B is placed in the on position the light E goes on to show that a current is flowing and that the conduction cooking of the wiener C has started.

Although my invention has been described in considerable detail, such description is intended as merely illustrative rather than limiting, as my invention may be variously embodied, and the scope of the invention is to be determined as claimed.

I claim as my invention:

In a wiener cooking device, a base, a pair of spaced wiener supports mounted on said base, each of said supports comprising an electrode having a central portion arranged substantially parallel to said base and a pair of end portions substantially perpendicular to said central portion, said end portions being spaced from each other by means of said central portion, each of said end portions extending away from the plane of said central portion in opposite directions, one of said end portions having a point thereon while the other of said end portions is screw-threaded and is adapted to extend through a hollow bushing which is rotatably mounted in an opening in said base, said hollow bushing extending beyond either end of said opening and being provided with a flange at that end which is closest to said central portion, said threaded end portion extending beyond that end of said bushing which is most remote from said central portion and having threadedly mounted thereon a pair of nuts, said nuts being positioned outwardly of the last mentioned end of said bushing, one of said nuts being adapted to abut against said last mentioned end of said bushing to lock said bushing in position on said base and the other of said nuts being adapted to frictionally secure an electrical conducting wire between itself and said first nut whereby said electrode may be supplied with electrical energy to be turned into heat energy for cooking a wiener impaled on the pointed end portions of both of said pair of spaced wiener supports, the pointed end portions of said spaced wiener supports being adapted to be brought closer to each other or farther away from each other by means of the rotational movement of said bushings, whereby wieners of varying lengths may be easily supported and thoroughly cooked.

MICHAEL SAVIO.

REFERENCES CITED

The following references are of record in the file of this patent:

UNITED STATES PATENTS

| Number | Name | Date |
|---|---|---|
| D. 90,182 | Young | June 20, 1933 |
| 1,754,574 | Sater | Apr. 15, 1930 |
| 2,269,178 | Breneman | Jan. 6, 1942 |
| 2,405,984 | Sharpe | Aug. 20, 1946 |

FOREIGN PATENTS

| Number | Country | Date |
|---|---|---|
| 251,068 | Great Britain | Apr. 29, 1926 |
| 263,208 | Great Britain | Dec. 21, 1926 |
| 592,641 | Great Britain | Sept. 24, 1947 |